United States Patent
Malkin

[15] 3,699,307
[45] Oct. 17, 1972

[54] OVEN CONTROL

[72] Inventor: Emanuel Malkin, Louisville, Ky.

[73] Assignee: Mass Feeding Corporation, Elk Grove Village, Ill.

[22] Filed: Aug. 26, 1970

[21] Appl. No.: 66,925

[52] U.S. Cl. ................................219/492, 219/412
[51] Int. Cl. .............................................H05b 1/02
[58] Field of Search......219/492, 497, 482, 486, 491, 219/412, 413

[56] References Cited

UNITED STATES PATENTS

| | | | |
|---|---|---|---|
| 3,560,712 | 2/1971 | Toohill | 219/497 |
| 3,465,126 | 9/1969 | Blumenkranz | 219/482 |
| 3,496,337 | 2/1970 | Voglesonger | 219/486 |
| 3,364,338 | 1/1968 | Holtkamp | 219/412 X |

Primary Examiner—Bernard A. Gilheany
Assistant Examiner—F. E. Bell
Attorney—Pendleton, Neuman, Williams & Anderson

[57] ABSTRACT

In an oven control, a plurality of individual timers are provided for controlling the heating interval of the oven. Each timer is independently selectable, and a control switch is associated with each timer for regulating the heat production rate of the oven when that timer is selected. A second control switch is associated with each timer to control the heat production rate when the oven is only half full. At the end of the timed interval, the temperature of the oven is quickly lowered to a warming temperature.

10 Claims, 3 Drawing Figures

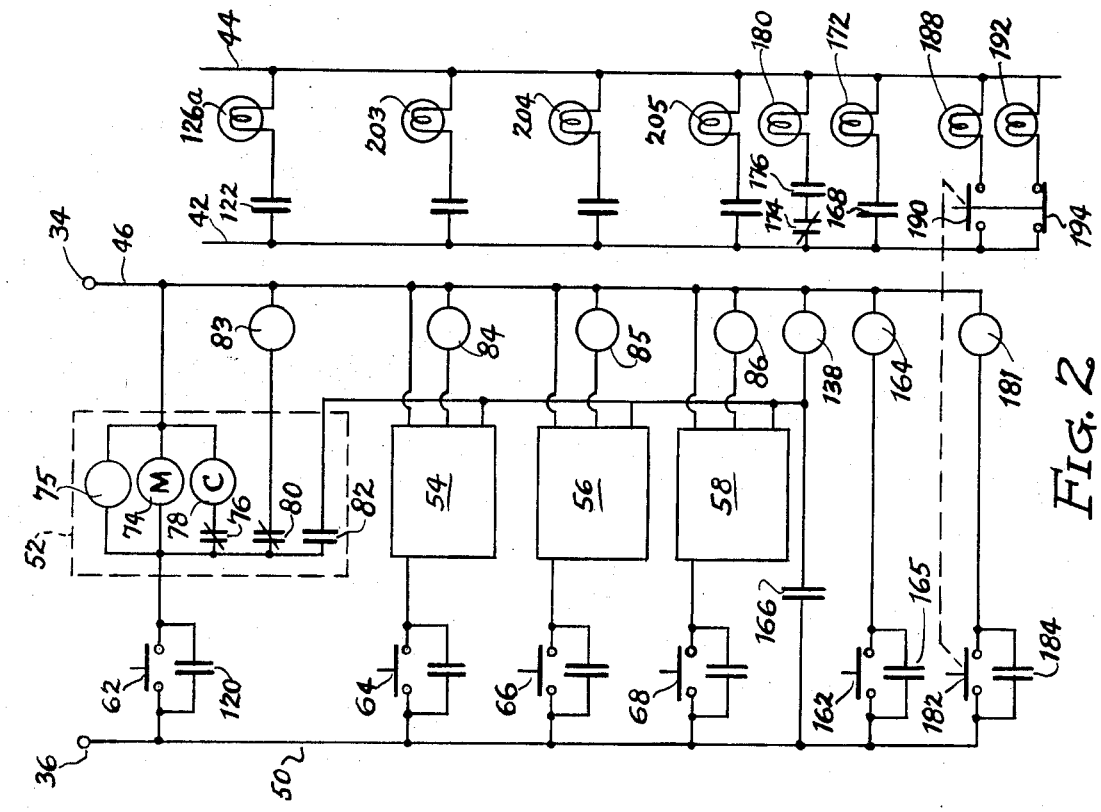
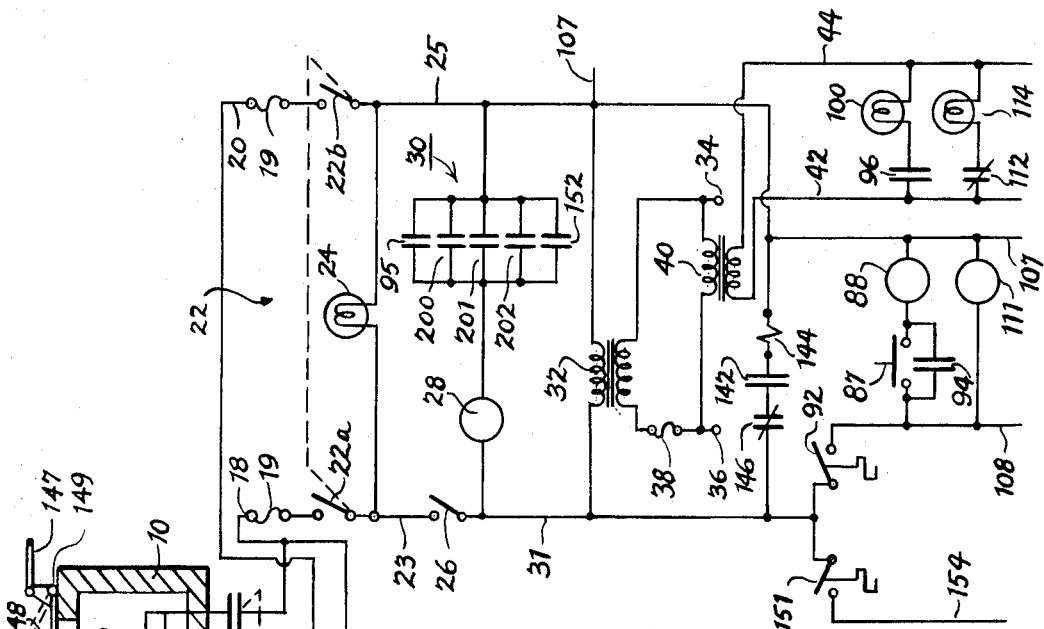

OVEN CONTROL

BACKGROUND OF THE INVENTION

The present invention relates to oven controls and more particularly to a control in which a number of different heating cycles may be individually selected, each of the cycles providing an individual heating period and an individual heat production rate.

Oven controls embodying the present invention are particularly suitable for heating large quantities of meals preparatory to serving them all at the same time, such as in schools and the like where a definite time period is provided for the serving and consumption of meals. In such conditions, the efficiency of meal production and service must be maximized, and as many as possible of the steps performed in the preparation and serving of the meals must be made as automatic as possible, so that a minimum of delay is encountered and the meals are all ready when needed.

SUMMARY OF THE INVENTION

An oven employing an oven control embodying the present invention is adapted to accept a large quantity of meal units of the same type, and a heating and/or cooking operation is performed on all the meal units simultaneously, using a preselected interval for the heating cycle and a selected heat production rate. An individual interval and an individual heat production rate is established in advance for each different meal unit which is to be heated and/or cooked. At the conclusion of the heating interval, the oven temperature is quickly lowered to a warming temperature which is maintained until the meals are removed from the oven.

It is a principle object of the present invention to provide an oven control adapted for use with large capacity ovens, designed to accept a large quantity of meal units for preparing the meal units for serving at approximately the same time.

Another object of the present invention is to provide an oven control having a plurality of individually selectable operating modes, each mode corresponding to the processing of meal units with different heating requirements.

A further object of the present invention is to provide an oven control having selectively operable means for compensating for a partially loaded oven by modifying the rate of heat production rate of the oven.

Another object of the present invention is to provide means for rapidly reducing the temperature of the oven, at the conclusion of the heating interval, to a warming temperature, and maintaining the warming temperature within the oven.

These and other objects of the present invention will become manifest upon an examination of the following description and accompanying drawings.

In one embodiment of the present invention, there is provided an oven control unit having a plurality of timers each of which is preset in accordance with the cooking interval required for a class of meal units, a plurality of control means each of which is preset to control the rate of heat production within the oven in accordance with the rate that is required for a class of meal units, each of the timers having two of the oven control units associated therewith, means for initiating operation of one of the timers, means for selecting one of the two heat control units associated with the selected timer, and means operative in response to the end of the interval of the selected timer for rapidly reducing the heat within the oven to a predetermined warming temperature, and means for maintaining the oven at the warming temperature.

DESCRIPTION OF THE INVENTION

Reference will now be made to the drawings in which:

FIG. 1 is a schematic diagram of a portion of an oven control unit incorporating an illustrative embodiment of the present invention;

FIG. 2 is a schematic diagram of another portion of the oven control unit, including certain switches and lamps used in selecting and indicating a heating cycle.

Figure 3:
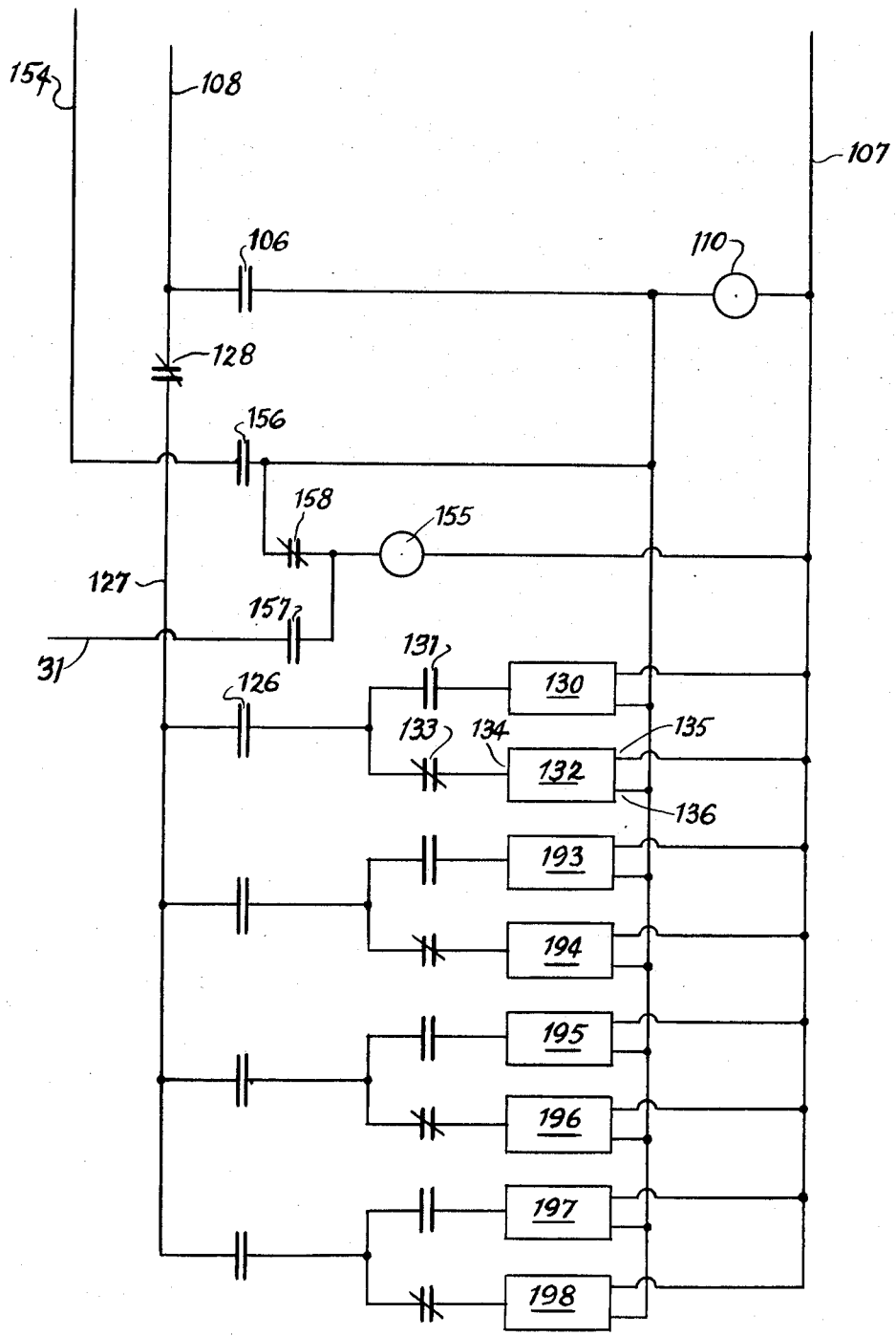
FIG. 3 is a schematic diagram of another portion of the oven control unit, including certain control switches for regulating the heat production rate of the oven.

Referring now to FIG. 1, there is illustrated in diagrammatic form an oven 10 having heating elements 12 disposed therein. The heating elements 12 are connected to a source of three phase electrical power at terminals 14 by means of a contacts 16. The three phase power at terminals 14 is preferably at a potential of 220 volts. The contacts 16 are opened and closed periodically by the oven control unit so as to maintain the interior of the oven 10 at a predetermined temperature.

Two of the terminals 14 are connected by means of lines 18 and 20 through fuses 19 to terminals of a main power switch 22, having sections 22a and 22b. When the switch 22 is closed, a pilot lamp 24 connected between lines 23 and 25 is illuminated to show that the power has been turned on. The section 22a connects the line 18 with the line 23, and section 22b connects the line 20 with the line 25.

A series circuit including a switch 26, a fan motor 28, and a circuit 30 of five parallelly connected contacts is connected between the lines 23 and 25. The switch 26 is closed whenever the door (not shown) of the oven 10 is shut. The fan motor 28 drives a fan 29 inside the oven 10. The five contacts of the circuit 30 will be more fully described hereinafter. One of them is closed at any time that the oven 10 is operating, to energize the fan motor 28 as long as the oven door is shut, closing the switch 26. The switch 26 connects the line 23 with a line 31, and a transformer 32 is connected between the line 31 and the line 25, so that it also is energized whenever the door switch 26 is closed. The transformer 32 is a stepdown transformer which provides a potential of 110 volts at its secondary, which is connected with terminals 34 and 36 through a fuse 38. A transformer 40, the purpose of which is to stepdown the 110 volts to a 5 volt potential, is connected across the terminals 34 and 36. The two ends of its secondary are connected to lines 42 and 44.

Referring now to FIG. 2, the terminal 34 is connected to a line 46 and four timers 52, 54, 56 and 58, each have a terminal connected to the line 46. The terminal 36 is connected to a line 50, and another terminal of each of the timers 52, 54, 56 and 58 is connected through a switch to the line 50. A terminal of the timer 52 is connected by a push button switch 62 to the line 50; a switch 64 connects the timer 54 to the line 50; a switch 66 connects the timer 56 to the line 50; and a switch 68 connects the timer 58 to the line 50.

Each of the four timers 52, 54, 56 and 58 is adapted to be individually selected for controlling the heating cycle of the oven for meal units having different heating requirements.

The timer 52 has a motor 74 connected between the switch 62 and the line 46, which motor furnishes the motive power for the timer 52. When the timer 52 has been selected and is operating, the motor 74 rotates at a substantially constant speed, and turns a cam which controls the operation of three pairs of contacts. A pair of normally closed contacts 76 are connected in series with a clutch 78 across the motor 74. A second pair of normally closed contacts 80 open at the end of the timing interval and normally open contacts 82 simultaneously close.

Each of the other three timers is identical to the timer 52. The four timers are connected to different circuits, as will be described. A relay coil 83 is connected between the normally closed contact 80 and the line 46. Corresponding relay coils 84, 85 and 86 are connected in identical fashion with the timers 54, 56 and 58, respectively. These coils effect the closing of certain contacts which bring about the heating of the oven in the desired manner.

In operation, after certain adjustable parameters have been set into the oven control, the door of the oven is closed, actuating the switch 26, and a preheating push button 87 (FIG. 1) is pushed, closing its contacts, which are connected through a relay coil 88 to the line 25, and through a thermostatic switch 92 to the line 31. The thermostatic switch 92 is closed as long as the temperature of the oven 10 is below a predetermined temperature, to which the thermostat has been set. Accordingly, since the oven is relatively cold when first started up, the thermostatic switch 92 is closed, and the relay coil 88 is energized. A pair of normally opened contacts 94 are closed by operation of the relay 88, and these contacts hold in the relay after the push button 87 is released. The relay 88 closes contacts 95 in the circuit 30 to energize the fan motor 28, and also closes contacts 96 which connect the line 42 through a lamp 100 to the line 44. The lamp 100 shows that the relay 88 has been operated and that the oven is being preheated.

A pair of normally open contacts 106 (FIG. 3) are also operated by the relay 88. The contacts 106 connect a line 107 through a relay coil 110 to a line 108. The line 107 is connected to the line 25 (FIG. 1) and the line 108 is connected through the thermostatic switch 92 to the line 31 (FIG. 1). Energization of the coil 110 closes the contacts 16 to apply three phase power to the heating elements 12 within the oven 10, bringing about an increase in the temperature of the oven 10. The fan 29, the motor 28 of which is energized by the contacts 95, operates to equalize the distribution of heat within the over 10 so that all portions within the oven are at substantially the same temperature.

When the temperature of the oven reaches the temperature to which the thermostatic switch 92 is set, the switch 92 opens, and thereby interrupts the power supplied to the relay coil 88 and to the contactor relay coil 110. The contacts 96 open, and extinguish the lamp 100.

The opening of the thermostatic switch 92 also interrupts the power to a relay coil 111, connected between the lines 107 and 108. The relay coil 111 operates a normally closed contact 112, which is connected in series with a lamp 114 between the lines 44 and 42. The reclosing of the contacts 112 with the opening of thermostatic switch 92 energizes the lamp 114 to signal that the oven is ready, having been heated to the correct temperature.

At this time the oven is loaded with the meal units which are to be heated, and one of the four timers 52, 54, 56 and 58 is selected for operation by depressing its respective push button 62, 64, 66 or 70. If the timer 52 is selected, the push button 62 is pressed, and the motor 74 is energized, together with an auxiliary relay coil 75 connected across the motor. The coil 75 closes a pair of contacts 120, connected across the push button switch 62, holding in the relay coil 75 and continuing to operate the motor 74 after the push button 62 is released.

Simultaneously with energization of the motor 74, the normally closed contacts 80 supply power to the relay coil 83. The relay coil 83 closes its associated contacts 122, to complete a circuit through a lamp 126 between lines 42 and 44. The lamp 126 indicates that the timer 62 has been selected and that the heating interval is being timed.

The relay coil 83 closes a pair of normally open contacts 126 (FIG. 3) which are connected from a line 127 to one of a pair of infinite control switch units 130 and 132, through normally open contacts 131 or normally closed contacts 133. The contacts 131 and 133 are operated by the same relay coil, so that only one of the switch units 130 and 132 is connected to the line 108. When the normally closed contact 133 remains closed, the switch unit 132 is energized.

The switch unit 132 has three terminals, viz., 134, 135 and 136. The terminals 134 and 135 are control terminals for the switch unit 132, and the main current flow path is between the terminals 134 and 136. Whenever a voltage is applied to the control terminals 134 and 135, cyclical contact is made between the terminals 134 and 136, thereby connecting the contactor coil 110 to the line 108 through the contacts 128, 126 and 133. The cyclical contact between the terminals 134 and 136 has a duty cycle which is controllable by manually adjustable means (not shown). Thus, when the adjustable means is controlled to produce a 50 percent duty cycle, the circuit between terminals 134 and 136 opens and closes cyclically, and the duration of closure is about equal to the duration in which the circuit is open. If the duty cycle is increased, the ratio of closed duration to open duration increases. The control switch unit 132 therefore regulates the heat production rate of the heating elements 12 of the oven 10 by regulating their duty cycle. As infinite controlled switch units such as the unit 132 are well known in the art, its internal construction need not be specifically described. All of the other switch units 130 and 193–198 are identical.

The adjustment of the duty cycle of the switch unit 132 is preset in advance, in accordance with the heating characteristic of the meal unit to be heated when the timer 52 is selected. The oven thus produces the required amount of heat per unit time to heat that particular meal.

If the temperature at which the thermostatic switch 92 is set is exceeded, the thermostatic switch 92 opens, disconnecting the line 31 from the line 108, and disabling the control switch 132. The contactor coil 110 then becomes de-energized, and the oven heating elements 12 are disconnected.

The temperature within the oven is maintained in this way by the thermostatic switch 92, and the rate of heat production determined by the setting of the control switch 132, until the expiration of the interval to which the timer 52 is set. When this interval expires, the contacts 76 are opened, thereby disabling the clutch 78. Simultaneously, the contacts 80 are opened and the contacts 82 are closed. The contacts 80 and 82 are operated by a cam on the driven member of the clutch 78, they remain in their operated positions even though the motor 74 remains energized, because the clutch 78 has been de-energized. Thereafter the motor 74 continues to turn until the contacts 120 are opened, when the oven door is opened. At that time the contacts 120, 76, 80 and 82 are all reset to their normal conditions, in readiness for a subsequent cycle.

The opening of the contacts 80 de-energizes the relay coil 83, which opens the contacts 126 to disable the switch unit 132. The closing of the contacts 82 energizes the relay coil 138 which is connected through the contacts 82 to the line 36. Energization of the relay coil 138 closes contacts 142 thereby connecting a solenoid 144 from line 25 through a normally closed contact 146 to line 31. The solenoid 144 is connected by a linkage 147 to a damper 148, hinged at 149, so that a port 150 in a wall of the oven 10 is opened. This permits heat to escape from the oven, rapidly lowering the oven temperature. The temperature drops until it reaches approximately 165° F, at which time thermostatic switch 151 opens.

At the moment the heating interval terminates, temperature in the oven is much higher than 165° F and so the thermostatic switch 151 is open at that time. The relay coil 138 closes contacts 152 in the circuit 30, so that the fan 29 continues to operate, helping to expel heat from the port 150. When the temperature falls to 165° F, the thermostatic switch 151 closes and a circuit is completed between line 31 and a line 154. A relay coil 155 is connected to the line 154 through normally open contacts 156 and normally closed contacts 158. The contacts 156 are closed by the relay coil 138, so that the relay coil 155 is energized as soon as the oven temperature reaches 165° F. The relay coil 155 closes a pair of contacts 157, which hold in the relay coil 155 by connecting it directly to the line 31. Simultaneously, the normally closed contacts 146 open to de-energize the solenoid 144, and close the damper 148. The damper remains closed thereafter. The normally closed contacts 158 are also opened by the coil 155, to prevent a direct connection from the line 31 to the contactor coil 110.

The contactor coil 110 is connected to the line 154 by the contacts 156, and is therefore energized at the same time the relay coil 155 is energized to apply power to the oven heating elements 12. The oven temperature is therefore raised to 165° F when the thermostatic switch 151 opens. A constant warming temperature of 165° F is assured by operation of the thermostatic switch 151. This continues until either the main switch 22 is opened or the door is opened, thereby opening the door switch 26. Either condition de-energizes the coil 155 and permits initiation of a new cycle of operation.

Interruption of the power connection between the lines 18 and 31, by opening the oven door or turning off the main switch 22 causes all of the contacts associated with the selected timer to be reset to the condition illustrated, so that they are ready for a subsequent cycle of operation. A suitable form of timer is made by the Eagle Timer Company, and is similar to model No. 178 with an auxilliary relay 75 to supply the contacts 120 which bridge the push button switch.

If a warming operation is desired, without a heating interval, a push button 162 is pushed, closing contacts which connect line 50 to one terminal of a relay coil 164, the other terminal of which is connected to the line 46. The relay coil 164 closes contacts 165, holding in the relay coil 164 after the push button 162 is released.

The relay coil 164 also closes a contact 166 which connects the relay coil 138 to the line 50. Accordingly, the contacts 156 are closed, to energize the contactor coil 110, thereby heating the oven 10 to the temperature controlled by the thermostatic switch 151. The relay coil 155 operates immediately when the starting temperature of the oven is less than the warming temperature, and the solenoid 144 is thereby prevented from operating. The fan is energized by means of the contacts 152 included in the circuit 30.

The line 42 is connected by a pair of contacts 168 to one terminal of a pilot lamp 172, the other terminal of which is connected to the line 44. The contacts 168 are operated by the coil 164, to illuminate the lamp 172 when the oven is in its warming mode of operation.

Normally closed contacts 174 are connected in series with normally open contacts 176 and a pilot lamp 180, and the series circuit is connected between the lines 42 and 44. The normally closed contacts 174 are controlled by the coil 164 and open when the oven is in its warming mode of operation, thereby preventing the pilot lamp 180 from becoming illuminated. Otherwise, the lamp 180 becomes illuminated when the relay coil 138 is energized, to signal the end of the timed interval and indicate that the oven control is in its warming mode. The pilot lamp 180 indicates that the oven has proceeded through a timer cycle and the meal units are ready to be served. In that event, the pilot lamp 172 does not light because the contacts 168 remain open.

During the timed heating cycle of the oven one of two infinite control switch units 130 and 132 are selected for operation to control the duty cycle of the contacts 16. That selection is under control of a relay coil 181, which is energized by means of a push button 182. The push button 182 is connected between the line 50 and one side of the relay coil 181, the other side being connected to the line 46. When the relay coil 181 is energized the contacts 133 (FIG. 3) are opened and the normally open contacts 131 are closed, thereby selecting the switch unit 130 for operating the contactor coil 110, which controls the contacts 16. The switch unit 132 is normally selected when a full load is to be heated in the oven. The switch unit 130 is selected when only about half of the normal number of meal units are to be heated in the oven. The reduced load in the oven calls for a lower heat production rate, and accordingly, a lower duty cycle of the switch unit. The adjustable controls on the infinite switch units 130 and 132 are adjusted to select the proper duty cycle for half load operation and full load operation, respectively. The half load switch 130 is selected when the push button 182 is pushed, and the coil 181 is energized. A set of contacts 184 are operated by the coil 181 to hold in the relay after the push button is released. A pilot lamp 188 is connected in series with a switch 190 between the lines 42 and 44, and a second pilot lamp 192 and a switch 194 are also connected between the lines 42 and 44. The push button 182 has two stable positions. The switch 194 is closed when the push button is in the position shown, and the switch 190 is closed when the push button 182 is in its operated position. The lamp 192 therefore indicates when full load operation is selected and the lamp 188 indicates when half load operation is selected.

Although only the control switch unit 132 has been described in detail, the other switch units 130 and 193-198 are identical in operation and construction. The units 193 and 194 are operative when the timer 54 is selected; the units 195 and 196 are operative when the timer 56 is selected; and the units 197 and 198 are operative when the timer 58 is selected. In each case, one of the switch units is selected for full load operation and the other is selected for half load operation when the relay coil 181 is energized. The switch units are commercially available and are preferably part No. INF—240-45 of the Indiana Division, Robertshaw Controls Co.

The contacts 200-202 are, respectively, associated with the timers 54, 56, and 58 and serve to energize the fan motor 28 during the heating intervals controlled by those timers. Pilot lamps 203-205 are also provided for the timers 54, 56 and 58, respectively, and signal the selection of one of the timers and the pendency of the timed heating period.

Preferably the pilot lamps 126, 203, 204 and 205 are of four different colors, and the push buttons 62, 64, 66 and 68 are of the same colors as their associated pilot lamps. The packages containing the meal units may then be color coded to correspond to the timer which is to be selected for heating each different type of meal unit.

The four timers 52, 54, 56 and 58 are provided so that the oven can accommodate four different types of meal units. It has been found that when frozen food meal units are to be heated in the oven, the thermostatic switch 92 is preferably set at 350° F. and the four timers are set respectively for duration of 20, 18, 16 and 14 minutes. The timer corresponding to the correct heating time for the meal units to be heated is selected by pushing one of the buttons 62, 64, 66 or 68 at the time the meal units are loaded into the oven. The provision of the four individually selectable timing intervals provides for a wide variety of meal units to be heated in the oven, with assurance that the meal units will be properly heated and ready for serving a specified time after they are placed into the oven.

What is claimed is:

1. In a control for an oven having a single chamber, said control having a plurality of operating modes for heating said chamber, the combination comprising: manually operable means for selecting one of said operating modes for controlling said oven for the heating, within said chamber, of articles having heating requirements corresponding to said selected mode, timer means connected to said selecting means and to said oven for causing said oven to be heated to a predetermined interval corresponding to said selected mode, wherein said timer means includes a plurality of timers, means for individually selecting one of said timers, thermostatic means for sensing the temperature within said oven, and control means connected with said thermostatic means for maintaining a first predetermined temperature within said oven for the interval set by said selected timer.

2. Apparatus according to claim 1 including manually operable means for selecting a warming operation, and means responsive to said manually operable means for maintaining the temperature within said oven at a second predetermined temperature less than said first predetermined temperature.

3. Apparatus according to claim 2 including means connected to said selected timer and responsive to the end of said interval for maintaining the temperature within said oven at a second predetermined temperature less than said first predetermined temperature.

4. Apparatus according to claim 1, wherein said control means comprises a plurality of adjustable control switch means for regulating the heat production rate of said oven, one of said control switch means being provided for each of said timers.

5. Apparatus according to claim 4 including contactor means adapted, when closed, to connect a source of electrical power with said oven, said adjustable control switch means being connected with said contactor to cyclically open and close said contactor with a predetermined duty cycle.

6. Apparatus according to claim 1, including means connected to said selected timer and responsive to the end of said interval for opening a port in said oven to reduce the temperature thereof to a second predetermined temperature.

7. Apparatus according to claim 6, including second thermostatic means, and means connected to said second thermostatic means and responsive thereto to reclose said port when said second predetermined temperature is reached.

8. In an oven control having a plurality of operating modes, the combination comprising; manually operable means for selecting one of said operating modes for controlling said oven for the heating of a class of articles having heating requirements corresponding to said selected mode, and timer means connected to said selector means and to said oven for causing said oven to be heated to a predetermined temperature for a predetermined interval corresponding to said selected mode, said timer means including a plurality of timers, means for individually selecting one of said timers, thermostatic means for sensing the temperature within said oven, and control means connected with said thermostatic means for maintaining a first predetermined temperature within said oven for the interval set by said selected timer, and switch means responsive to the opening of a door of said oven, and means connecting said switch means with said timers for resetting said timers when said door is opened.

9. In an oven control having a plurality of operating modes, the combination comprising; manually operable means for selecting one of said operating modes for controlling said oven for the heating of a class of articles having heating requirements corresponding to said selected mode, and timer means connected to said selector means and to said oven for causing said oven to be heated to a predetermined temperature for a predetermined interval corresponding to said selected mode, said timer means including a plurality of timers, means for individually selecting one of said timers, thermostatic means for sensing the temperature within said oven, and control means connected with said thermostatic means for maintaining a first predetermined temperature within said oven for the interval set by said selected timer, said control means comprising a pair of adjustable control switch means for regulating the heat production rate of said oven, one of said control switch means being provided for each of said timers, and a pair of adjustable control switch means for each of said timers, one of said pair being adapted to maintain the heat production rate of said oven at approximately half the rate maintained by the other of said pair.

10. In an oven having a single chamber a control having a plurality of pre-determined operating modes, each for heating said chamber at a pre-selected heat production rate for a preselected time interval, said control comprising manually operable means for selecting one of said operating modes for controlling said oven for the heating within said chamber of articles having heating requirements corresponding to said selected mode, timer means operatively connected to said selecting means and to said oven for causing said oven to be heated for a time interval corresponding to said selected mode, and heat regulating means operatively connected to said selecting means and to said oven for regulating the heat production rate of said oven in accordance with the operating modes selected.

* * * * *